United States Patent [19]

Gilch et al.

[11] Patent Number: 5,173,538

[45] Date of Patent: * Dec. 22, 1992

[54] MOISTURE-CURING, POLYURETHANE HOT-MELT COMPOSITIONS

[75] Inventors: Heinz G. Gilch, Bad Homburg; Walter Rath, Oberursel, both of Fed. Rep. of Germany

[73] Assignee: Bostik, Inc., Middleton, Mass.

[ * ] Notice: The portion of the term of this patent subsequent to Mar. 12, 2008 has been disclaimed.

[21] Appl. No.: 422,932

[22] Filed: Oct. 17, 1989

[30] Foreign Application Priority Data

Nov. 15, 1988 [GB] United Kingdom ............... 8826702

[51] Int. Cl.$^5$ .................. C08G 18/10; C08G 18/70; C08L 75/04; C08L 75/08
[52] U.S. Cl. .................. 525/130; 525/131; 525/403; 525/404; 525/408; 525/409; 525/440; 525/454; 525/455; 525/458; 525/460; 528/60; 528/66; 528/67
[58] Field of Search ............ 525/458, 460, 130, 131, 525/440, 454, 455, 409, 403, 404, 408; 538/67, 60, 66

[56] References Cited

U.S. PATENT DOCUMENTS

| | | | |
|---|---|---|---|
| 3,012,987 | 12/1961 | Ansul | 525/458 |
| 3,094,495 | 6/1963 | Gemeinhardt | 525/458 |
| 3,271,352 | 9/1966 | Weinberg | 525/458 |
| 3,514,427 | 5/1970 | Owens | 260/41.5 |
| 4,552,934 | 11/1985 | Rabito et al. | 525/458 |
| 4,929,667 | 5/1990 | Ban et al. | 524/718 |
| 4,957,959 | 9/1990 | Matsumoto et al. | 524/196 |

FOREIGN PATENT DOCUMENTS

| | | |
|---|---|---|
| 0196749 | 2/1986 | European Pat. Off. . |
| 0244608 | 3/1987 | European Pat. Off. . |

*Primary Examiner*—Ana L. Carrillo
*Attorney, Agent, or Firm*—David G. Conlin; Peter F. Corless; Gregory D. Williams

[57] ABSTRACT

A quick-setting, moisture-curing hot-melt polyurethane composition having a first polyether-based polyurethane prepolymer having a Tg above room temperature and a second polyurethane prepolymer with a Tg below room temperature, the first prepolymer being prepared from a low molecular weight polyether; preferably the second prepolymer is also polyether based and prepared from a high molecular weight polyether.

28 Claims, No Drawings

MOISTURE-CURING, POLYURETHANE HOT-MELT COMPOSITIONS

BACKGROUND OF THE INVENTION

The present invention relates to moisture-curing, polyurethane hot-melt adhesive compositions based on polyethers. Hitherto hot-melt materials including eva, polyester or polyamide have been used for fast bonding processes and automatic adhesive application requiring quick setting bonds but these have usually been applied at temperatures of about 150°–200° C.

For example, solvent-free reactive polyurethane hot-melt materials, such as are disclosed in German Specification DOS 2609266, solve the problem of high application temperatures by application of a low-viscosity hot melt at 100° C. which sets by crystallisation. Such adhesive systems exhibit good thermolytic and hydrolytic stability when chain-extended and cross-linked by atmospheric moisture. However, bonds provided by these crystallising polyurethane prepolymers have low elasticity before curing resulting in low initial peel strength immediately after bonding and have a lower setting rate which depends on the crystallisation rate of the polyester used. Other reactive crystalline polyurethane hot melts, such as the adhesive compositions disclosed in German Specification DOS 3236313, do show a better elasticity in the uncured state but have an undesirably high application temperature (approaching those of conventional hot-melt materials) and exhibit pot life problems at application. It is accordingly an object of the present invention to provide quick-setting, hot-melt adhesive compositions comprising polyurethane prepolymers which have improved flexibility immediately after bonding whilst being heat stable and resistant to hydrolytic and chemical attack after curing.

Our copending U.S. patent application Ser. No. 347124 filed May 4, 1989 now U.S. Pat. No. 4,999,407 describes and claims a quick setting, hot-melt polyurethane adhesive composition comprising a mixture of at least two amorphous polyurethane prepolymers, each polyurethane prepolymer providing a different glass transition point for said composition. Preferably the first polyurethane prepolymer has a glass transition point above room temperature and a second polyurethane prepolymer has a glass transition point below room temperature.

These products are fast setting with high elasticity, even before curing.

Polyethers such as polypropylene oxide, polyethylene oxide or polyoxybutylene have low glass transition temperatures and little if any crystallinity and thus do not seem to lend themselves to the preparation of hot-melt compositions.

SUMMARY OF THE INVENTION

According to the present invention a quick-setting, hot-melt polyurethane composition comprising a mixture of at least two polyurethane prepolymers is characterised by a first polyether-based polyurethane prepolymer having a glass transition point above room temperature and a second polymer or polyurethane prepolymer with a glass transition point below room temperature.

Polyurethane prepolymers with Tg above room temperature may be prepared from low molecular weight polyethers (MW less than 1000) and polyisocyanates. Polyurethane prepolymers with Tg below room temperature may be prepared from high molecular weight polyethers, polyesters or polybutadienes and polyisocyanates.

Preferably the second polyurethane prepolymer is also polyether based and prepared from high molecular weight polyether (MW greater than 1000) and polyisocyanates.

A prepolymer with Tg above room temperature sets quickly on cooling down from the application temperature but gives a brittle bond at room temperature.

A prepolymer with Tg below room temperature may be applied at a relatively low temperature, even as low as room temperature but the applied film tends to remain tacky and to remain elastic when cured. Such bonds are flexible down to the low glass transition point and little or no cohesion is observed before curing.

A composition according to the present invention provides an optimisation of these two sets of properties, giving a fast-setting adhesive curing with atmospheric moisture to give flexible bonding over a wide temperature range.

The compositions according to the present invention also avoid the hydrolytic degradation to which polyester polyurethanes are susceptible.

Compositions according to the present invention may be prepared either by mixing two separately-prepared prepolymers or by a combined, one-shot procedure, depending on the polyols used.

The first polyurethane prepolymer with a high Tg (above room temperature) is prepared from a polyether polyol and a polyisocyanate.

The polyol has a molecular weight between approximately 200 and 1000, preferably 250 and 800, most preferably approximately 400. Prepolymers of such products have a Tg above room temperature if NCO/OH ratio is kept sufficiently low.

Reducing molecular weight of polyols and NCO/OH-ratio of prepolymers increases the Tg of prepolymers. Such products require higher application temperatures, are faster setting and give bonds which are more brittle. Prepolymers based on typical chain extenders such as propylene glycol are not suitable for the present invention.

The polyols used may be any type of polyether-polyols such as polypropylene oxide, polyethylene oxide polyoxybutylene or copolymers. Polyethyleneglycol-based products are less suitable because of their high water absorption.

The polyisocyanate is preferably an aromatic diisocyanate such as 4.4'-diphenylmethane- or 2.4'-toluenediisocyanate. Derivates with functionalities higher than two may also be used if NCO/OH-ratios for synthesis are kept sufficiently high.

Aliphatic polyisocyanates can also be used but are generally found to be less suitable.

The prepolymer with the high (above room temperature) glass transition point is prepared at a NCO/OH ratio of 1.1 to 2.0, preferably 1.15 to 1.5 and at temperatures above the application temperature of the final product, preferably between 80° and 140° C.

For prepolymer synthesis, no catalyst is required but for faster curing of the final product any catalyst suitable for one part polyurethanes can be added in a quantity of 10–10,000 ppm, preferably 100–1000 ppm.

For prepolymer synthesis from polyethers special stabilization is recommended. A variety of stabilizers like acids, β-dicarboxylic compounds and reactive isocyanates, as well as antioxidants, may be used.

The polyurethane prepolymer with the low (below room temperature) glass transition point is also a reaction product of a polyol and a polyisocyanate. The polyol may be a linear or slightly branched polyether, polyester, polybutadiene or another OH-terminated polyol.

Again polypropylene oxide, polyethylene oxide polyoxybutylene or copolymers are suitable polyethers and these have a molecular weight of more than 800, preferably more than 1000.

Although polyether based polyurethanes are preferred, polyurethane prepolymers with Tg below room temperature based on polyesters or polybutadienes can be used for the present invention as well as non reactive polymers with low Tg like polyolefins and their copolymers, high molecular weight polyesters, polyethers or polyurethanes.

Generally we prefer to use diols in the compositions of the invention, but the use of polyols with higher functionality can result in superior final bonding properties due to crosslinking facilities (for details see examples described hereafter).

The polyisocyanate used to prepare the compositions of the invention is preferably an aromatic diisocyanate such as 4.4'-diphenylmethane diisocyanate or 2.4-toluene diisocyanate or derivates with functionality higher than two but aliphatic diisocyanates may also be used. The prepolymer is prepared at a NCO/OH ratio between 1.1 and 3, preferably 1.2 and 2.5 and at temperatures between room temperature and 140° C., preferably between 60° and 100° C. using stabilization as mentioned above, and with or without typical catalysts.

The final product properties depend significantly on the types and mixing ratio of high and low Tg-prepolymers.

If more prepolymer with high glass transition point is used, the adhesive is more viscous and initial strength is superior. Bonds are tougher but they are more inclined to be brittle at lower temperatures.

By using more prepolymer with a lower Tg, the adhesive becomes less viscous, initial strength is lower and bonds are softer and more flexible.

After application of the adhesive, the curing reaction with atmospheric moisture starts. Isocyanate reacts with water and carbon dioxide is formed. This often leads to unwanted foaming of the adhesive during curing. The degree of foaming depends on the quantity of carbon dioxide liberated, the reaction rate and the diffusion characteristics of the polymer system. The quantity of carbon dioxide can be controlled by NCO/OH ratio of prepolymers and molecular weight of polyols.

The final product may also include usual and ingredients such as fillers, tackifying resins or plasticizers. The resulting mixture is usually transparent at room temperature and applied above the high Tg, preferably between 90° and 140° C.

DETAILED DESCRIPTION OF THE INVENTION

In order that the invention may be better understood preferred Examples will now be described in greater detail.

EXAMPLE I

Prepolymer A1 (Low Tg)

800 g (428 mVal) polypropylene oxide of molecular weight 4000 and 4.5 g toluolsulfonyl isocyanate are placed in a closed reactor at 60° C., 107 g (855 mVal) methylene diphenyl diisocyanate (MDI) are added and the temperature raised to 110° C. for two hours. 1.8 g dibutyl tin dilaurate (DBTL) are added and stirred for further 15 minutes at 110°–115° C. under vacuum.

The prepolymer has a viscosity of 620 mPas at 130° C., a NCO-content of 406 mVal/kg and a glass transition point of approximately −60° C.

Prepolymer B (High Tg)

351.3 g (2806 mVal) MDI are melted at approximately 40° C. in a closed reactor. 4.3 g toluolsulfonyl isocyanate and 500 g (2375 mVal) polypropylene oxide of molecular weight 400 are added. After heating one hour at approximately 60° C. and one hour at 120° C., 0.9 g DBTL are added and stirring at 120° C. is continued for 20 minutes. The prepolymer has a viscosity of 22 Pas at 130° C., a NCO content of 520 mVal/kg and a glass transition point of approximately +22° C.

Formulation of Adhesive Composition (I)

93.7 g of the prepolymer A1 are added to 856.5 of the prepolymer B at 120°–125° C. and stirred for approximately one hour.

The mixture is a colourless, transparent liquid at 130° C. with a viscosity of 12 Pas and a NCO-content of 485 mVal/kg. Differential Scanning Calorimetry (DSC) shows a glass transition point of approximately +7° C.

The adhesive sets quickly and has good bond strength over a wide range of temperatures. (See the following tables). Foaming during curing is negligible if the thin layers of adhesive are applied.

EXAMPLE II

Prepolymer A2 (Low Tg)

80.4 g (642 mVal) MDI are melted at 44° C. 2.4 g toluolsulfonyl isocyanate and 400 g (257 mVal) polypropylene oxide (triol) added. The temperature is raised to 117° C. for approximately 1 hour.

The prepolymer has a viscosity of 375 mPas at 130° C. and a NCO-content of 829 mVal/kg.

Formulation of Adhesive Composition (II)

860.6 g prepolymer B from Example I are placed in a reactor at 130° C., 107.7 g prepolymer A2 are added and stirring is continued for 2 hours.

The mixture is a colourless, transparent liquid at 130° C. with a viscosity of 12 Pas and a NCO content of 554 mVal/Kg. The adhesive sets quickly and has good bond strength over a wide range of temperatures. High temperature strength is improved (see following tables). Foaming is avoided by applying the adhesive thinly.

EXAMPLE III

Prepolymer A3 (Low Tg)

800 g (507 mVal) of an amorphous polyester from 1.6 hexane diol and a mixture of adipic acid and isophthalic acid with a molecular weight of 3500 sulfonyl isocyanate 4.6 g p-toluol are placed at 80° C. in a reactor with 127 g (1015 mVal) MDI are added under stirring and the temperature raised to 80° C. for 30 min and then to 127° C. for 45 min.

After degassing under vacuum, a prepolymer A3 with a viscosity of 9 Pas at 130° C. and a NCO content of 555 mVal/kg is obtained.

Formulation of Adhesive Composition (III)

855 g prepolymer B according to example I are placed in a reactor of 130° C. and 92.7 g prepolymer A3 are added and stirred for 1.5 hours at 130° C. The mixture is a colourless, transparent liquid at 130° C. with a viscosity of 20 Pas and a NCO content of 500 mVal/kg.

The adhesive sets quickly and has good bond strength to a variety of plastics. (see following tables)

Foaming during curing is avoided by applying the adhesive thinly.

EXAMPLE IV (One-Shot Procedure)

500 g (2375 mVal) polypropylene oxide diol of molecular weight 400 and 90.2 g (48 mVal) of a polypropyleneoxide diol with molecular weight 4000 are placed in a closed reactor at 70° C. After addition of 4.8 g toluolsulfonyl isocyanate 368 g (2940 mVal) MDI is added under stirring. The temperature is raised to 105° C. and stirring is continued for 1 hour. 1.19 DBTL is then added and stirring is continued for 1 hour at 110° C.

After degassing under vacuum, a prepolymer with viscosity of 6.8 Pas at 130° C. and a NCO content of 539 mVal/kg is obtained. The adhesive is colourless and transparent with good initial and final bonding properties. (see following tables) Foaming during curing is avoided by applying the adhesive thinly.

TABLE 1

| Initial Strength (measured after 10 minutes) | | |
|---|---|---|
| | Tensile shear strength Wood (N/mm$^2$) | Peel strength canvas (N/mm) |
| EXAMPLE I | 1.8 | 2.8 |
| EXAMPLE II | 1.0 | 3.0 |
| EXAMPLE III | 1.5 | 0.8 |
| EXAMPLE IV | 0.6 | 1.5 |

TABLE 2

| Final Bond Strength | | | |
|---|---|---|---|
| | Tensile shear strength (wood) (N/mm$^2$) | | |
| | r.t. | 100° C. | 150 |
| EXAMPLE I | 7.8 | 1.6 | 1.3 |
| EXAMPLE II | 8.4 | 1.9 | 1.4 |
| EXAMPLE III | 10.2 | 0.8 | 0.7 |
| EXAMPLE IV | 8.8 | not determined | |

TABLE 3

| Hydrolysis Resistance Tensile shear strength of beechwood bonds after hydrolysis B 4/10-test according to DIN 68602 (six hours boiling water, seven days drying at room temperature) | |
|---|---|
| EXAMPLE I | 7.7 |

The adhesive composition of Example I was assessed for resistance to hydrolysis by measuring tensile shear strength of beechwood bonds after hydrolysis. The assessment was carried out by the B4/10 test according to DIN 68602 and the tensile shear strength measured after six hours in boiling water followed by seven days drying at room temperature. The results showed a tensile shear strength of 7.7 N/mm$^2$.

We claim:

1. A hot-melt polyurethane composition, comprising: a mixture comprising a first polymer and second polymer, wherein the first polymer is a polyether-based polyurethane prepolymer having a glass transition point above room temperature, and which is prepared from an isocyanate and a polyether, the polyether polyol having a molecular weight between about 250 and 800, the mole ratio of the isocyanate groups to the hydroxyl groups of the isocyanate and the polyether polyol being from about 1.1 to 2.5, and wherein the second polymer is a polyurethane or polyurethane prepolymer and has a glass transition point below room temperature.

2. A hot-melt polyurethane composition according to claim 1, wherein the first polymer is prepared from linear or branched polyether polyols selected from the group of polypropylene oxide, polyethylene oxide, polyoxybutylenes or copolymers thereof.

3. A hot-melt polyurethane composition according to claim 1 wherein said mole ratio of the isocyano groups to the hydroxyl groups of the isocyanate and the polyether polyol is from about 1.15 to 1.5.

4. A hot-melt polyurethane composition according to claim 1 wherein the ratio of the first polymer to the second polymer in the mixture is between about 99:1 and 50:50.

5. A hot-melt polyurethane composition according to claim 1 wherein the first polymer is prepared from an aromatic diisocyanate.

6. A hot-melt polyurethane composition according to claim 1 wherein the first polymer is prepared from an aliphatic diisocyanate.

7. A hot-melt polyurethane composition according to claim 1 wherein the first polymer is prepared from (a) 4.4'-diphenylmethane diisocyanate (4,4'-MDI), (b) a derivative of 4,4'-MDI with a functionality higher than two, (c) 2,4-toluene diisocyanate (2,4-TDI), or (d) a derivative of 2,4-TDI with a functionality higher than two.

8. A hot-melt polyurethane composition according to claim 1 wherein the second polymer is a polyether based polyurethane prepolymer.

9. A hot-melt polyurethane composition according to claim 8 wherein the second polymer is prepared from linear or branched polyether polyols selected from the group of polypropylene oxide, polyethylene oxide, polyoxybutylenes, or copolymers thereof have a molecular weight of greater than 1000.

10. A hot-melt polyurethane composition according to claim 8 wherein the second polymer is prepared at a NCO/OH ratio between 1.1 and 2.5.

11. A hot-melt polyurethane composition according to claim 8 wherein the first polymer and the second polymer are prepared together in a single process.

12. A hot-melt polyurethane composition according to claim 1 wherein the first polymer and the second polymer are prepared separately and then combined.

13. A hot-melt polyurethane composition according to claim 1 where the polyether polyol has a molecular weight of about 400.

14. A hot-melt polyurethane composition according to claim 1 where the first polymer is formed from reagents consisting essentially of a polyether polyol and an isocyanate.

15. A hot-melt polyurethane composition according to claim 1 where the first polymer is formed from reagents comprising an isocyanate and a polyether polyol and is substantially free from other chain extenders.

16. A hot-melt polyurethane composition according to claim 1 wherein said mole ratio of the isocyano groups to hydroxyl groups of the isocyanate and the polyether polyol is from about 1.1 to 2.0.

17. A hot-melt polyurethane composition according to claim 1 wherein the second polymer is selected from the group consisting of a polyester-based polymer, a polyether-based polymer and a polybutadiene-based polymer.

18. A hot-melt polyurethane composition according to claim 1 wherein the second polymer is prepared from a polyester polyol.

19. A hot-melt polyurethane composition according to claim 1 wherein the second polymer is prepared from a polybutadiene polyol.

20. A hot-melt polyurethane composition, comprising: a mixture comprising a first polymer and second polymer, wherein the first polymer is a polyether-based polyurethane prepolymer having a glass transition point above room temperature, the first polymer formed from reagents comprising an isocyanate and a polyether polyol and is substantially free from other chain extenders, the mole ratio of isocyano groups to hydroxyl groups of the isocyanate and polyether polyol being from about 1.1 to 2.5, and wherein the second polymer is a polyurethane or polyurethane prepolymer and has a glass transition point below room temperature.

21. A hot-melt polyurethane composition according to claim 20 wherein said mole ratio of isocyanate groups to hydroxyl groups of the isocyanate and the polyether polyol is from about 1.1 to 2.0.

22. A hot-melt polyurethane composition according to claim 20 wherein said mole ratio of the isocyano groups to the hydroxyl groups of the isocyanate and the polyether polyol is from about 1.15 to 1.5.

23. A hot-melt polyurethane composition according to claim 1 wherein the second polymer is selected from the group consisting of a polyester-based polymer, a polyether-based polymer and a polybutadiene-based polymer.

24. A hot-melt polyurethane composition according to claim 20 wherein the second polymer is prepared from a polyether polyol.

25. A hot-melt polyurethane composition according to claim 20 wherein the second polymer is prepared from linear or branched polyether polyols selected from the group consisting of polypropylene oxide, polyethylene oxide, polyoxybutylenes, and copolymers thereof having a molecular weight of greater than 1000.

26. A hot-melt polyurethane composition according to claim 20 wherein the second polymer is prepared from an isocyanate and a polyether polyol and the mole ratio of the isocyanate groups to the hydroxyl groups of the isocyanate and the polyether polyol is from about 1.1 to 2.5.

27. A hot-melt polyurethane composition according to claim 20 wherein the second polymer is a prepared from a polyester polyol.

28. A hot-melt polyurethane composition according to claim 20 wherein the second polymer is prepared from a polybutadiene polyol.

* * * * *